United States Patent
Fukuda et al.

(10) Patent No.: US 12,372,157 B2
(45) Date of Patent: Jul. 29, 2025

(54) VALVE DEVICE

(71) Applicant: KYB Corporation, Tokyo (JP)

(72) Inventors: Shunsuke Fukuda, Kanagawa (JP); Ryo Fukushima, Nagano (JP)

(73) Assignee: KYB CORPORATION, Tokyo (JP)

( * ) Notice: Subject to any disclaimer, the term of this patent is extended or adjusted under 35 U.S.C. 154(b) by 0 days.

(21) Appl. No.: 18/690,369

(22) PCT Filed: Sep. 13, 2022

(86) PCT No.: PCT/JP2022/034265
§ 371 (c)(1),
(2) Date: Mar. 8, 2024

(87) PCT Pub. No.: WO2023/105872
PCT Pub. Date: Jun. 15, 2023

(65) Prior Publication Data
US 2024/0376988 A1      Nov. 14, 2024

(30) Foreign Application Priority Data

Dec. 10, 2021    (JP) .................................. 2021-200730

(51) Int. Cl.
*F16K 11/07*    (2006.01)
(52) U.S. Cl.
CPC .......... *F16K 11/07* (2013.01); *F16K 11/0708* (2013.01); *F16K 11/0716* (2013.01)
(58) Field of Classification Search
CPC .. F16K 11/07; F16K 11/0708; F16K 11/0716; F15B 13/0402
See application file for complete search history.

(56) References Cited

U.S. PATENT DOCUMENTS

| | | | | |
|---|---|---|---|---|
| 2010/0037603 | A1* | 2/2010 | Weickert | E02F 9/2239 60/421 |
| 2010/0269935 | A1* | 10/2010 | Breunig | F15B 13/0417 137/625.42 |
| 2015/0362084 | A1* | 12/2015 | Coolidge | F16K 11/07 137/625.48 |
| 2020/0096121 | A1* | 3/2020 | Kojima | F15B 13/042 |
| 2021/0310570 | A1* | 10/2021 | Kashid | F16K 11/0708 |
| 2024/0328121 | A1* | 10/2024 | Horii | F16K 3/24 |

FOREIGN PATENT DOCUMENTS

JP       2008-008386 A       1/2008

* cited by examiner

*Primary Examiner* — Kelsey E Cary
(74) *Attorney, Agent, or Firm* — Rabin & Berdo, P.C.

(57) ABSTRACT

A valve device includes: a main spool including supply passages and a supply-side land portion; and a valve block including an outflow passage, in which the supply passage allows a supply port to communicate with the outflow passage in a process of the main spool moving from a neutral position toward one stroke end in an axial direction, and the supply passage allows a supply port to communicate with the outflow passage in a process of the main spool moving from the neutral position toward the other stroke end in the axial direction, and the supply passage allows the supply port to communicate with the outflow passage in the process of the main spool moving toward the one stroke end and allows the supply port to communicate with the outflow passage in the process of the main spool moving toward the other stroke end.

4 Claims, 5 Drawing Sheets

VALVE DEVICE

TECHNICAL FIELD

The present invention relates to a valve device.

BACKGROUND ART

JP2008-8386A discloses a multiple switching valve, including: a valve body; a spool slidably incorporated in the valve body; a pair of supply ports connected to a pump; an introduction port formed between the pair of supply ports and communicating with one of the supply ports according to a movement position of the spool; an actuator port communicating with an actuator; and a bridge passage to which fluid guided to the introduction port is supplied and which communicates with the actuator port according to the movement position of the spool. A first annular groove is provided approximately in the center of the spool, and notches are formed on both sides of the first annular groove.

The multiple switching valve described in JP2008-8386A blocks communication between the introduction port and the supply ports when the spool is in a neutral position. When the spool moves rightward, one supply port communicates with the introduction port via the first annular groove and the notch.

SUMMARY OF INVENTION

In the multiple switching valve described in JP2008-8386A, a flow rate of the working fluid flowing from one supply port to the introduction port is controlled by an opening area of the notch. However, the notch is provided on an outer peripheral surface of the spool, and an upper limit of the opening area of the notch is determined by an outer diameter of the spool, and therefore, in such a multiple switching valve, there is an upper limit to increasing the opening area of the notch. Therefore, in the multiple switching valve described in JP2008-8386A, it is difficult to increase the flow rate of the working fluid that is guided from the supply port to the actuator through the introduction port.

An object of the present invention is to increase a flow rate of working fluid that is guided from a supply port to an actuator in a valve device.

According to one aspect of the present invention, a valve device for controlling a flow of a working fluid supplied from a hydraulic pump to an actuator, the valve device includes: a spool that is movable in an axial direction; and a valve body that slidably accommodates the spool, the valve body includes: a first supply port and a second supply port that is supplied with the working fluid discharged from the hydraulic pump, a first actuator passage and a second actuator passage in communication with the actuator, a discharge passage in communication with a tank, and an outflow passage that guides the working fluid from the first supply port and the second supply port to the first actuator passage and the second actuator passage, the spool includes: a first supply passage that guides the working fluid from the first supply port to the outflow passage as the spool moves and provides resistance to a flow of the working fluid that passes through the first supply passage, a second supply passage that guides the working fluid from the second supply port to the outflow passage as the spool moves and provides resistance to a flow of the working fluid that passes through the second supply passage, a third supply passage that allows the first supply port to communicate with the outflow passage and the second supply port to communicate with the outflow passage, and provides resistance to the working fluid that passes through the third supply passage, and a land portion that is capable of blocking communications of the first supply passage, the second supply passage, and the third supply passage with the outflow passage, the land portion blocks communication between the first supply port and the outflow passage and communication between the second supply port and the outflow passage when the spool is in a neutral position, the first supply passage allows the first supply port to communicate with the outflow passage in a process of the spool moving from the neutral position toward one stroke end in the axial direction, the second supply passage allows the second supply port to communicate with the outflow passage in a process of the spool moving from the neutral position toward the other stroke end in the axial direction, and the third supply passage allows the second supply port to communicate with the outflow passage in the process of the spool moving toward the one stroke end, and allows the first supply port to communicate with the outflow passage in the process of the spool moving toward the other stroke end.

DESCRIPTION OF EMBODIMENTS

A valve device according to an embodiment of the present invention will be described with reference to the drawings. The valve device is mounted on a working machine such as a construction machine, an agricultural machine, or an industrial machine equipped with a traveling device. A valve device mounted on a crawler hydraulic excavator as a working machine will be described below as an example. The example will be described in which hydraulic oil is used as a working fluid for driving an actuator of the hydraulic excavator, but other kinds of fluid such as hydraulic water may also be used as the working fluid.

Although not shown, the hydraulic excavator includes a traveling portion, a rotating portion that is rotatably provided on an upper portion of the traveling portion, and an excavating portion that is provided on the rotating portion. The traveling portion includes a crawler. The crawler is driven by a travel motor 111 as an actuator, which will be described later, so that the hydraulic excavator travels. The excavating portion includes a boom rotatably attached to the rotating portion, an arm rotatably attached to the boom, and a bucket rotatably attached to the arm.

The hydraulic excavator includes an engine (not shown), a pump 110 as a hydraulic pump that is driven by the engine and discharges the hydraulic oil, a valve device 100 that controls a flow of the hydraulic oil discharged from the pump 110 and supplied to the actuators for driving the traveling portion, the rotating portion, the excavating portion, and the like, and a tank 119 to which the hydraulic oil flows back from the valve device 100. In the present embodiment, the hydraulic excavator includes a plurality of valve devices 100 and a plurality of actuators, and each valve device 100 controls operation of one actuator.

Figure 1:
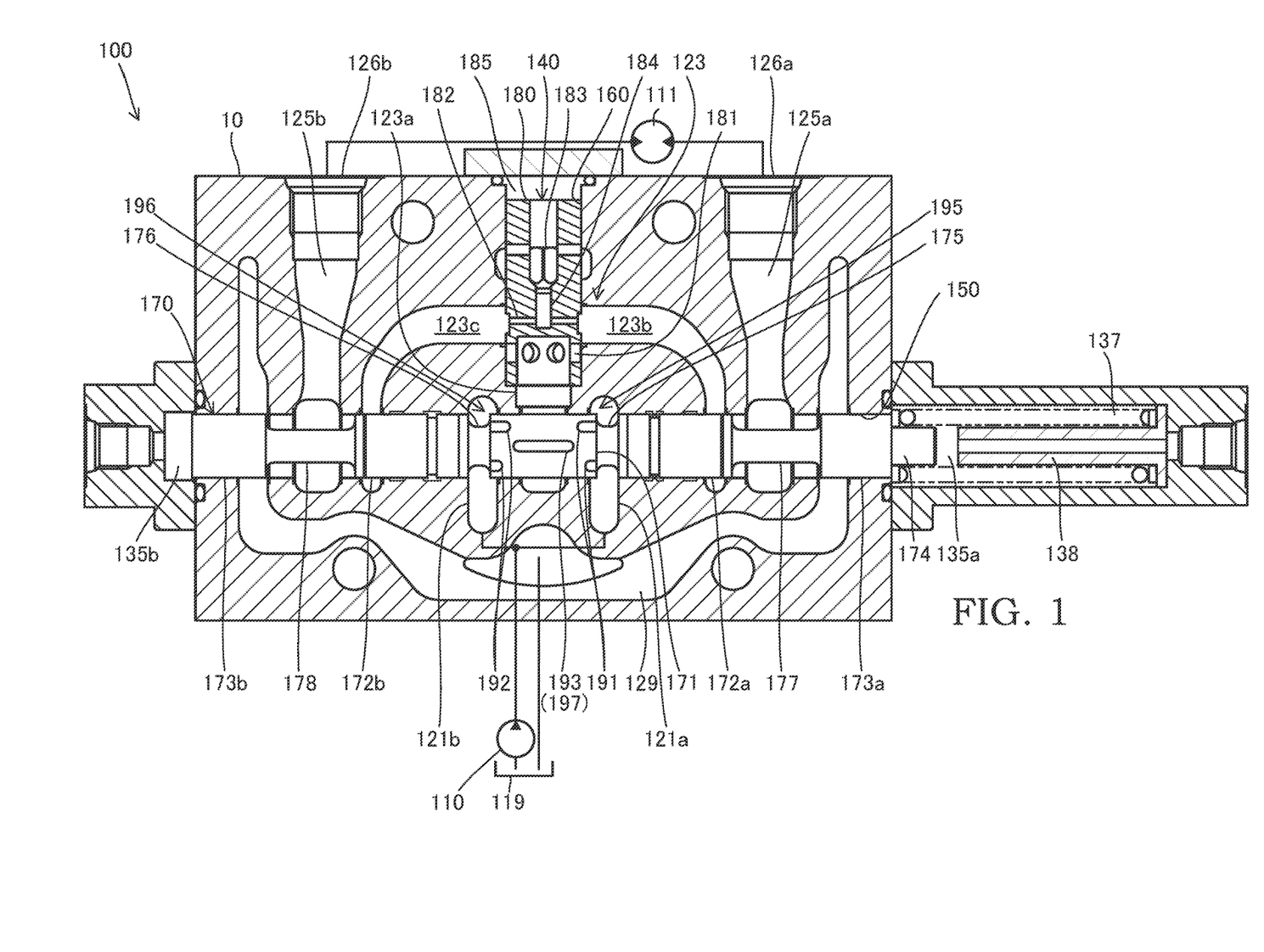
FIG. 1 is a cross-sectional view of a valve device according to an embodiment of the present invention, showing a state in which a main spool is in a neutral position.
Figure 2:
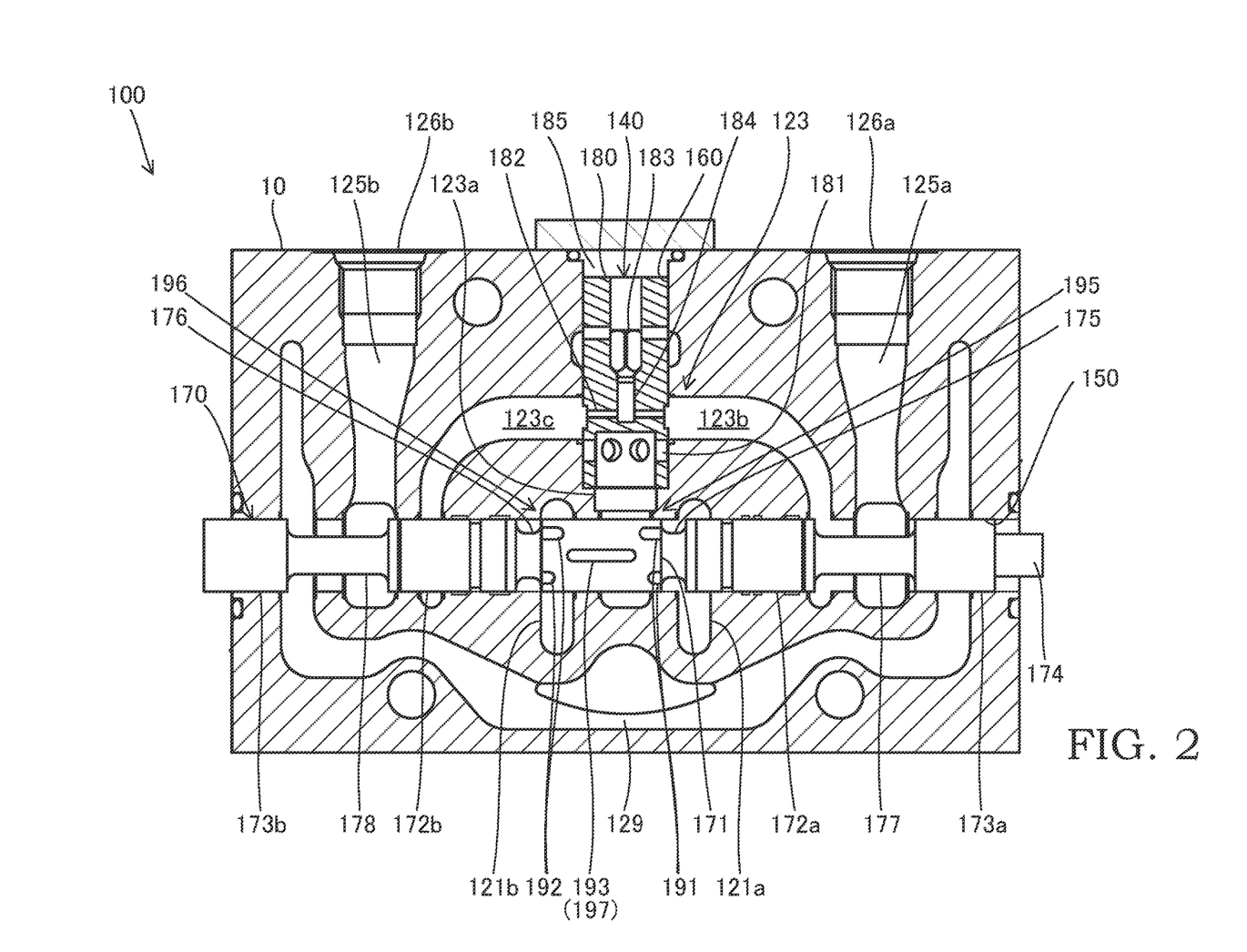
FIG. 2 is a cross-sectional view showing the valve device according to the embodiment of the present invention, showing a state in which the main spool is moved to a forward position.
Figure 3:
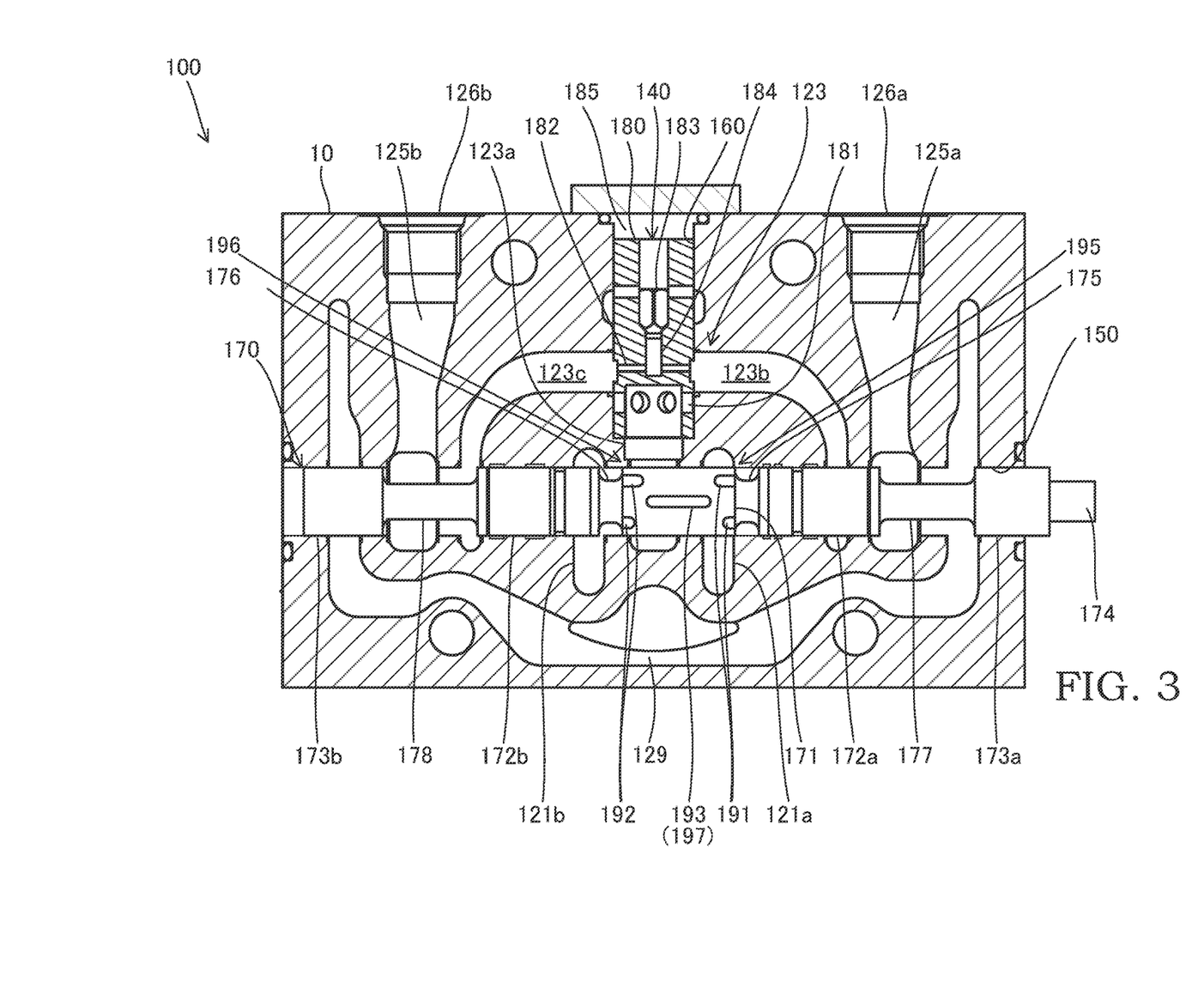
FIG. 3 is a cross-sectional view showing the valve device according to the embodiment of the present invention, showing a state in which the main spool is moved to a retracted position.

The valve device 100 will be described in detail with reference to FIGS. 1 to 3. In the present embodiment, the valve device 100 that controls the operation of the travel motor 111, which is a hydraulic motor for driving the traveling portion as an actuator, will be described as an example. FIGS. 1 to 3 are cross-sectional views showing the valve device 100, and FIG. 1 shows a state in which a main spool 170 is in a neutral position. FIG. 2 shows a state in which the main spool 170 is moved to a forward position (from the neutral position to a left side in FIGS. 1 to 3). FIG. 3 shows a state in which the main spool 170 is moved to a retracted position (from the neutral position to a right side in FIGS. 1 to 3). Note that in FIGS. 2 and 3, descriptions of the pump 110, the travel motor 111, the tank 119, a first pilot pressure chamber 135a, a second pilot pressure chamber 135b, and the like, which will be described later, are omitted.

As shown in FIG. 1, the valve device 100 includes the main spool 170 as a spool that is movable in an axial direction, a compensator spool 180 that moves in a direction orthogonal to the axial direction of the main spool 170, and a valve block 10 as a valve body that slidably accommodates the main spool 170 and the compensator spool 180.

The main spool 170 moves in the axial direction based on a travel operation command. The travel operation command corresponds to a pilot pressure output from a pilot pressure output portion (not shown) to the first pilot pressure chamber 135a or the second pilot pressure chamber 135b, which will be described later, according to an operation amount of a travel operation lever (not shown).

The valve block 10 is provided with a main accommodation hole 150 as an accommodation hole that slidably accommodates the main spool 170, and a sub accommodation hole 160 that slidably accommodates the compensator spool 180. The structures of the valve block 10 and the main spool 170 are substantially bilaterally symmetrical.

The valve device 100 includes the first pilot pressure chamber 135a and the second pilot pressure chamber 135b for controlling the driving of the main spool 170, a centering spring 137 for biasing the main spool 170 provided in the first pilot pressure chamber 135a along the axial direction, and a position regulating portion 138 for regulating a position of the other stroke end of the main spool 170, which will be described later.

When the first pilot pressure chamber 135a and the second pilot pressure chamber 135b are connected to the tank 119 and no pilot pressure is acting on the first pilot pressure chamber 135a and the second pilot pressure chamber 135b, the main spool 170 is held in a neutral position by a biasing force of the centering spring 137. When a pilot pressure acts on the first pilot pressure chamber 135a, the main spool 170 moves from the neutral position to the left side in FIG. 1 and is switched to the forward position. When the main spool 170 is switched to the forward position, the hydraulic oil is supplied to the travel motor 111 so that the hydraulic excavator moves forward. When a pilot pressure acts on the second pilot pressure chamber 135b, the main spool 170 moves from the neutral position to the right side in FIG. 1 and is switched to the retracted position. When the main spool 170 is switched to the retracted position, the hydraulic oil is supplied to the travel motor 111 so that the hydraulic excavator moves backward.

The valve block 10 includes first and second supply ports 121a and 121b to which the hydraulic oil discharged from the pump 110 is supplied, first and second actuator passages 125a and 125b communicating with the travel motor 111, a discharge passage 129 communicating with the tank 119, and an outflow passage 123 that guides the hydraulic oil from the first and second supply ports 121a and 121b to the first and second actuator passages 125a and 125b. The first and second supply ports 121a and 121b, the first and second actuator passages 125a and 125b, the discharge passage 129, and the outflow passage 123 open to the main accommodation hole 150.

The travel motor 111 performs driving by the hydraulic oil being supplied from the pump 110 by the valve device 100 through the first and second actuator passages 125a and 125b.

The hydraulic oil supplied from the pump 110 to the first and second supply ports 121a and 121b is guided to the travel motor 111 through the outflow passage 123 and the first actuator passage 125a or the outflow passage 123 and the second actuator passage 125b. The hydraulic oil of the travel motor 111 is discharged from the first and second actuator passages 125a and 125b to the tank 119 through the discharge passage 129.

The outflow passage 123 includes a first passage 123a extending from the main accommodation hole 150 in a radial direction, and second and third passages 123b and 123c extending in two directions from the first passage 123a. The second and third passages 123b and 123c form a so-called bridge passage so that the outflow passage 123 has a bridge shape.

A part of the sub accommodation hole 160 is formed in the first passage 123a of the outflow passage 123. The first passage 123a communicates with the main accommodation hole 150 and the sub accommodation hole 160. The compensator spool 180 is interposed between the second and third passages 123b and 123c. One end of each of the second and third passages 123b and 123c communicates with the main accommodation hole 150, and the other end thereof communicates with the first passage 123a and the sub accommodation hole 160.

The first actuator passage 125a communicates with the first actuator port 126a opening to the outer peripheral surface of the valve block 10 and the main accommodation hole 150, and the second actuator passage 125b communicates with the second actuator port 126b opening to the outer peripheral surface of the valve block 10 and the main accommodation hole 150. The discharge passage 129 communicates with the tank 119 and near both ends of the main accommodation hole 150 in the axial direction.

In this way, the main accommodation hole 150 communicates with the discharge passage 129, the first actuator passage 125a, the second passage 123b of the outflow passage 123, the first supply port 121a, the first passage 123a of the outflow passage 123, the second supply port 121b, the third passage 123c of the outflow passage 123, the second actuator passage 125b, and the discharge passage 129 in this order from the right side to the left side in FIG. 1. In other words, in the main accommodation hole 150, the opening of the first passage 123a of the outflow passage 123 is provided axially between the opening of the first supply port 121a and the opening of the second supply port 121b. Note that the "opening of the outflow passage" in SCOPE OF CLAIMS refers to the opening of the first passage 123a of the outflow passage 123.

The main spool 170 has a plurality of cylindrical land portions that are in sliding contact with an inner peripheral surface of the main accommodation hole 150. Specifically, the main spool 170 includes a supply-side land portion 171 provided at a central portion in the axial direction of the main spool 170, first and second outflow-side land portions 172a and 172b provided so that the supply-side land portion 171 is positioned therebetween, and first and second discharge-side land portions 173a and 173b provided so that the first and second outflow-side land portions 172a and 172b are positioned therebetween. The supply-side land portion 171 corresponds to the "land portion" in SCOPE OF CLAIMS.

The land portions are provided in an order of the first discharge-side land portion 173a, the first outflow-side land portion 172a, the supply-side land portion 171, the second outflow-side land portion 172b, and the second discharge-side land portion 173b, from one end in the axial direction (the right side in FIG. 1) toward the other end in the axial direction (the left side in FIG. 1).

An outer peripheral surface of the supply-side land portion 171 can block communication between the first and second supply ports 121a and 121b and the first passage 123a of the outflow passage 123. An outer peripheral surface of the first outflow-side land portion 172a can block communication between the second passage 123b of the outflow passage 123 and the first actuator passage 125a, and an outer peripheral surface of the second outflow-side land portion 172b can block communication between the third passage 123c of the outflow passage 123 and the second actuator passage 125b. An outer peripheral surface of the first discharge-side land portion 173a can block communication between the first actuator passage 125a and the discharge passage 129, and an outer peripheral surface of the second discharge-side land portion 173b can block communication between the second actuator passage 125b and the discharge passage 129.

The second discharge-side land portion 173b is in contact with an inner wall of the second pilot pressure chamber 135b to regulate one stroke end of the main spool 170. The first discharge-side land portion 173a is provided with a projecting portion 174 projecting in the axial direction. The projecting portion 174 is in contact with the position regulating portion 138 to regulate the other stroke end of the main spool 170.

An annular groove is provided between each two land portions. A first annular groove 175 facing one end portion of the supply-side land portion 171 is provided between the supply-side land portion 171 and the first outflow-side land portion 172a. A second annular groove 176 facing the other end portion of the supply-side land portion 171 is provided between the supply-side land portion 171 and the second outflow-side land portion 172b. A third annular groove 177 is provided between the first outflow-side land portion 172a and the first discharge-side land portion 173a. A fourth annular groove 178 is provided between the second outflow-side land portion 172b and the second discharge-side land portion 173b.

The supply-side land portion 171 is provided with first notches 191 opening to the first annular groove 175, second notches 192 opening to the second annular groove 176, and a communication notch 193 opening to the outer peripheral surface of the supply-side land portion 171.

The first notches 191 are provided on the outer peripheral surface of the supply-side land portion 171, extend from one end portion of the supply-side land portion 171 in the axial direction of the main spool 170, and are provided in plurality at equal intervals in a circumferential direction. The first notches 191 do not all have the same length in the axial direction of the main spool 170, and some of the first notches 191 have different lengths in the axial direction of the main spool 170 from other first notches 191. The first notches 191 and the first annular groove 175 form the first supply passage 195, which guides the hydraulic oil from the first supply port 121a to the outflow passage 123 as the main spool 170 moves and provides resistance to the flow of the hydraulic oil passing through.

The first notches 191 face the first supply port 121a and do not face the first passage 123a of the outflow passage 123 in a state in which the main spool 170 is in the neutral position. Therefore, the first supply passage 195 does not allow the first supply port 121a to communicate with the outflow passage 123 when the main spool 170 is in the neutral position. As shown in FIG. 2, when the main spool 170 is in the forward position (the left side in FIGS. 1 to 3), that is, moves from the neutral position to the one stroke end in the axial direction, the first annular groove 175 faces the first supply port 121a, and the first notches 191 face the first passage 123a of the outflow passage 123 to allow the first supply port 121a to communicate with the outflow passage 123. That is, the first supply passage 195 allows the first supply port 121a to communicate with the outflow passage 123 in a process of the main spool 170 moving from the neutral position toward the one stroke end in the axial direction. The one stroke end is specifically a state in which the second discharge-side land portion 173b of the main spool 170 is in contact with an inner wall of the second pilot pressure chamber 135b. Note that only one first notch 191 may be provided, or the plurality of first notches 191 may be provided at different intervals in the circumferential direction. The plurality of first notches 191 may be provided with the same shape.

The second notches 192 are provided on the outer peripheral surface of the supply-side land portion 171, extend from the other end portion of the supply-side land portion 171 in the axial direction of the main spool 170, and are provided in plurality at equal intervals in the circumferential direction. The second notches 192 do not all have the same length in the axial direction of the main spool 170, and some of the second notches 192 have different lengths in the axial direction of the main spool 170 from other second notches 192. The second notches 192 and the second annular groove 176 form the second supply passage 196, which guides the hydraulic oil from the second supply port 121b to the outflow passage 123 as the main spool 170 moves and provides resistance to the flow of the hydraulic oil passing through.

As shown in FIG. 1, the second notches 192 face the second supply port 121b and do not face the first passage 123a of the outflow passage 123 in a state in which the main spool 170 is in the neutral position. Therefore, the second supply passage 196 does not allow the second supply port 121b to communicate with the outflow passage 123 when the main spool 170 is in the neutral position. As shown in FIG. 3, when the main spool 170 is in the retracted position (the right side in FIGS. 1 to 3), that is, moves from the neutral position to the other stroke end in the axial direction, the second annular groove 176 faces the second supply port 121b, and the second notches 192 face the first passage 123a of the outflow passage 123 to allow the second supply port 121b to communicate with the outflow passage 123. That is, the second supply passage 196 allows the second supply port 121b to communicate with the outflow passage 123 in a process of the main spool 170 moving from the neutral position toward the other stroke end in the axial direction. The other stroke end is specifically a state in which the projecting portion 174 of the main spool 170 is in contact with the position regulating portion 138. Note that only one second notch 192 may be provided, or the plurality of second notches 192 may be provided at different intervals in the circumferential direction. The plurality of second notches 192 may be provided with the same shape.

The communication notch 193 is provided axially extending between the first notches 191 and the second notches 192 in the axial direction of the main spool 170, and allows the first supply port 121a to communicate with the outflow passage 123, and allows the second supply port 121b to communicate with the outflow passage 123. The communication notch 193 forms the third supply passage 197 that allows the first supply port 121a to communicate with the outflow passage 123, and allows the second supply port 121b to communicate with the outflow passage 123, and provides resistance to the hydraulic oil passing through. The communication notch 193 does not open to the first annular groove 175 and the second annular groove 176.

As shown in FIG. 1, the communication notch 193 faces the first passage 123a of the outflow passage 123 and does not face the first supply port 121a and the second supply port 121b in the state in which the main spool 170 is in the neutral position. Therefore, the third supply passage 197 does not allow the first supply port 121a to communicate with the outflow passage 123 and does not allow the second supply port 121b to communicate with the outflow passage 123 when the main spool 170 is in the neutral position.

As shown in FIG. 2, when the main spool 170 moves to the forward position, the communication notch 193 faces the second supply port 121b and the first passage 123a of the outflow passage 123, and the third supply passage 197 allows the second supply port 121b to communicate with the outflow passage 123. That is, the third supply passage 197 passes through the interior of the main accommodation hole 150 and allows the second supply port 121b to communicate with the outflow passage 123 in the process of the main spool 170 moving from the neutral position toward the one stroke end in the axial direction. As shown in FIG. 3, when the main spool 170 moves to the retracted position, the communication notch 193 faces the first supply port 121a and the first passage 123a of the outflow passage 123, and the third supply passage 197 allows the first supply port 121a to communicate with the outflow passage 123. That is, the third supply passage 197 passes through the interior of the main accommodation hole 150 and allows the first supply port 121a to communicate with the outflow passage 123 in the process of the main spool 170 moving from the neutral position toward the other stroke end in the axial direction. Note that only one communication notch 193 may be provided, or a plurality of communication notches 193 may be provided at equal or different intervals in the circumferential direction.

Therefore, when the main spool 170 is in the neutral position, the communication between the first supply port 121a and the outflow passage 123 and the communication between the second supply port 121b and the outflow passage 123 are blocked. As shown in FIG. 2, when the main spool 170 moves to the forward position, the first supply passage 195 allows the first supply port 121a to communicate with the outflow passage 123, and the third supply passage 197 allows the second supply port 121b to communicate with the outflow passage 123. As shown in FIG. 3, when the main spool 170 moves to the retracted position, the third supply passage 197 allows the first supply port 121a to communicate with the outflow passage 123, and the second supply passage 196 allows the second supply port 121b to communicate with the outflow passage 123. That is, in the valve device 100 of the present embodiment, when the main spool 170 moves from the neutral position to both stroke ends, both the first and second supply ports 121a and 121b and the outflow passage 123 communicate with each other.

As described above, in the valve device 100 of the present embodiment, the hydraulic oil is guided from the opening of the first supply port 121a to the opening of the outflow passage 123 through the interior of the main accommodation hole 150, and the hydraulic oil is guided from the opening of the second supply port 121b to the opening of the outflow passage 123 through the interior of the main accommodation hole 150, in both the process of the main spool 170 moving toward the forward position (the one stroke end) and the process of the main spool 170 moving toward the retracted position (the other stroke end). In other words, the flow of the hydraulic oil from the first supply port 121a to the outflow passage 123 and the flow of the hydraulic oil from the second supply port 121b to the outflow passage 123 inside the main accommodation hole 150 are in opposite directions in the axial direction of the main spool 170. As a result, a fluid force from the hydraulic oil guided from the first supply port 121a to the outflow passage 123 acting on the main spool 170 and a fluid force from the hydraulic oil guided from the second supply port 121b to the outflow passage 123 acting on the main spool 170 can be canceled out. Therefore, hysteresis of the main spool 170 can be improved, and operation of the valve device 100 is improved.

Note that cross sections of the first notch 191, the second notch 192, and the communication notch 193 perpendicular to the axial direction of the main spool 170 may have the same area or different areas. In the process of the main spool 170 moving toward the forward position, a timing at which the third supply passage 197 allows the second supply port 121b to communicate with the outflow passage 123 may be the same as or different from a timing at which the first supply passage 195 allows the first supply port 121a to communicate with the outflow passage 123. Furthermore, in the process of the main spool 170 moving toward the retracted position, a timing at which the third supply passage 197 allows the first supply port 121a to communicate with the outflow passage 123 may be the same as or different from a timing at which the second supply passage 196 allows the second supply port 121b to communicate with the outflow passage 123.

In this way, the supply-side land portion 171 is provided with the first notches 191, the second notches 192, and the communication notch 193. A region on the outer peripheral surface of the supply-side land portion 171, where the first notches 191, the second notches 192, and the communication notch 193 are not provided, blocks the communication between the first supply port 121a and the outflow passage 123 and the communication between the second supply port 121b and the outflow passage 123. In other words, the supply-side land portion 171 can block the communication between the first, second, and third supply passages 195, 196, 197 and the outflow passage 123, and in the state in which the main spool 170 is in the neutral position, blocks the communication between the first supply port 121a and the outflow passage 123 and the communication between the second supply port 121b and the outflow passage 123.

The compensator spool 180 adjusts loads of the plurality of actuators when the plurality of actuators controlled by the plurality of valve devices 100 are operated simultaneously. In this way, a load sensing system using the compensator spool 180 is adopted in the plurality of valve devices 100 provided in the hydraulic excavator in the present embodiment.

The compensator spool 180 includes one end (a lower end in FIGS. 1 to 3) that is provided facing the first passage 123a of the outflow passage 123, and the other end (an upper end in FIGS. 1 to 3) facing a maximum load pressure chamber 185 into which a maximum load pressure (the highest load pressure among the load pressures of the actuators controlled by the plurality of valve devices 100) is introduced. The compensator spool 180 compensates for the pressure in the first passage 123a of the outflow passage 123 to be higher than the maximum load pressure by a predetermined value. As a result, when the actuators are simultaneously driven by the plurality of valve devices 100, the hydraulic oil can be supplied at a flow rate corresponding to an amount of movement of the main spool 170 of the valve device 100 regardless of a magnitude of the load pressure of the actuator.

The compensator spool 180 is provided with a throttle portion 181 that provides resistance to the hydraulic oil passing from the first passage 123a of the outflow passage 123 to the second passage 123b and the third passage 123c, in an initial stage when the compensator spool 180 moves to the maximum load pressure chamber 185 side. An opening degree of the throttle portion 181 with respect to the second passage 123b and the third passage 123c increases as the compensator spool 180 moves toward the maximum load pressure chamber 185 side.

The compensator spool 180 is provided with a pressure introduction portion 182 whose opening degree with respect to the second passage 123b and the third passage 123c is variable according to a movement position of the compensator spool 180. The opening degree of the pressure introduction portion 182 with respect to the second passage 123b and the third passage 123c decreases as the compensator spool 180 moves toward the maximum load pressure chamber 185 side.

A high pressure selection valve 183 is also incorporated in the compensator spool 180. The high pressure selection valve 183 is disposed so that one end (a lower end in FIGS. 1 to 3) thereof faces a pressure introduction chamber 184 and the other end (an upper end in FIGS. 1 to 3) thereof faces the maximum load pressure chamber 185. The high pressure selection valve 183 maintains a closed state when the pressure in the maximum load pressure chamber 185 is higher than the pressure in the pressure introduction chamber 184. On the other hand, the high pressure selection valve 183 opens when the pressure in the pressure introduction chamber 184 is higher than the pressure in the maximum load pressure chamber 185, and guides the pressure of the pressure introduction chamber 184 to the maximum load pressure chamber 185 of other valve devices 100.

The operation of the valve device 100 according to the present embodiment will be described with reference to FIGS. 1 to 3.

When an operator of the hydraulic excavator operates a travel operation lever (not shown) provided in an operator cab, a pilot pressure as a travel operation command acts on the first pilot pressure chamber 135a or the second pilot pressure chamber 135b of the valve device 100. When traveling straight ahead, the operator tilts a left travel operation lever and a right travel operation lever forward. Hereinafter, as the operation of the valve device 100 when the left and right travel operation levers (not shown) are simultaneously operated to the forward direction to cause the hydraulic excavator to travel straight ahead, operation of the main spool 170 and the compensator spool 180 and the flow of the hydraulic oil in the valve device 100 will be described in detail.

As shown in FIG. 1, when the travel operation lever is held at a neutral position, the main spool 170 is held at the neutral position. When the main spool 170 is in the neutral position, the outer peripheral surface of the supply-side land portion 171 blocks the communication between the first supply port 121a and the outflow passage 123, and the communication between the second supply port 121b and the outflow passage 123. The outer peripheral surface of the first discharge-side land portion 173a blocks the communication between the first actuator passage 125a and the discharge passage 129, and the outer peripheral surface of the second discharge-side land portion 173b blocks the communication between the second actuator passage 125b and the discharge passage 129.

When the main spool 170 is in the neutral position, the outer peripheral surface of the first outflow-side land portion 172a blocks the communication between the second passage 123b of the outflow passage 123 and the first actuator passage 125a, and the outer peripheral surface of the second outflow-side land portion 172b blocks the communication between the third passage 123c of the outflow passage 123 and the second actuator passage 125b.

When the travel operation lever is started to be operated to the forward direction, the pilot pressure acts on the first pilot pressure chamber 135a, and the main spool 170 moves to the forward position. As shown in FIG. 2, when the main spool 170 moves to the forward position (from the neutral position to the left side in FIGS. 1 to 3), the first supply port 121a and the first passage 123a of the outflow passage 123 communicate with each other through the first supply passage 195 (specifically, the first annular groove 175 and the first notches 191). Furthermore, the second supply port 121b and the first passage 123a of the outflow passage 123 communicate with each other through the third supply passage 197 (specifically, the communication notch 193). In this way, since the hydraulic oil is guided to the first passage 123a from both the first and second supply ports 121a and 121b, the amount of the hydraulic oil guided from both the first and second supply ports 121a and 121b to the first passage 123a is increased as compared with a case where the hydraulic oil is guided from one of the first and second supply ports 121a and 121b.

The hydraulic oil from the first and second supply ports 121a and 121b is throttled by the first notches 191 and the communication notch 193 and guided to the first passage 123a. Hypothetically, if the hydraulic oil is guided to the first passage 123a from the first and second supply ports 121a and 121b without passing through any throttle such as a notch, at the moment when the first supply port 121a communicates with the first passage 123a and the second supply port 121b communicates with the first passage 123a, a large amount of hydraulic oil is guided to the first passage 123a, and a flow rate of the hydraulic oil flowing into the first passage 123a cannot be controlled. However, in the valve device 100 of the present embodiment, the first notches 191 and the communication notch 193 control the flow rate of the hydraulic oil flowing into the first passage 123a, and the amount of the hydraulic oil guided to the first passage 123a from the first and second supply ports 121a and 121b is increased.

When the hydraulic oil is guided to the first passage 123a of the outflow passage 123, the pressure in the first passage 123a causes the compensator spool 180 to move upward in the drawings against the pressure in the maximum load pressure chamber 185. When the compensator spool 180 moves upward in the drawings, the opening degree of the throttle portion 181 increases. Therefore, as the opening degree of the throttle portion 181 increases, the flow rate of the hydraulic oil guided from the first passage 123a of the outflow passage 123 to the second passage 123b increases.

When the main spool 170 is in the forward position, the second passage 123b of the outflow passage 123 and the first actuator passage 125a communicate with each other through the third annular groove 177 of the main spool 170. Therefore, the hydraulic oil guided to the second passage 123b is guided through the third annular groove 177 to the first actuator passage 125a.

The hydraulic oil guided to the first actuator passage 125a is supplied to the travel motor 111 through the first actuator port 126a, and the travel motor 111 rotates. The hydraulic oil discharged from the travel motor 111 is guided to the second actuator passage 125b through the second actuator port 126b. When the main spool 170 is in the forward position, the second actuator passage 125b and the discharge passage 129 communicate with each other through the fourth annular groove 178 of the main spool 170. Therefore, the hydraulic oil guided to the second actuator passage 125b is guided to the discharge passage 129 through the fourth annular groove 178 and discharged to the tank 119.

Note that when the left and right travel operation levers are operated to a reverse side, the movement of the main spool 170 is reversed to that described above. That is, as shown in FIG. 3, when the main spool 170 moves to the retracted position (from the neutral position to the right side in FIGS. 1 to 3), the first supply port 121a and the first passage 123a of the outflow passage 123 communicate with each other through the third supply passage 197 (specifically, the communication notch 193). Furthermore, the second supply port 121b and the first passage 123a of the outflow passage 123 communicate with each other through the second supply passage 196 (specifically, the second annular groove 176 and the second notches 192). Then, the hydraulic oil is guided from the first passage 123a of the outflow passage 123 to the second actuator passage 125b through the third passage 123c and the fourth annular groove 178 of the main spool 170. On the other hand, the hydraulic oil discharged from the travel motor 111 is guided to the discharge passage 129 through the first actuator port 126a, the first actuator passage 125a, and the third annular groove 177, and discharged to the tank 119.

In this way, in the valve device 100 of the present embodiment, the main spool 170 includes a third supply passage 197 that allows communication between the first supply port 121a and the outflow passage 123, and the communication between the second supply port 121b and the outflow passage 123. As a result, when the main spool 170 moves to both stroke ends, the working fluid is guided to the outflow passage 123 from both of the first and second supply ports 121a and 121b rather than from either one thereof. As a result, the flow rate of the hydraulic oil guided to the travel motor 111 through the outflow passage 123 from the first and second supply ports 121a and 121b is increased. Therefore, an output of the travel motor 111 increases.

Furthermore, in the valve device 100 of the present embodiment, the first notches 191, the second notches 192, and the communication notch 193 allow the first supply port 121a to communicate with the outflow passage 123, and allow the second supply port 121b to communicate with the outflow passage 123. Therefore, since the hydraulic oil from the first and second supply ports 121a and 121b is throttled and guided by the first notches 191, the second notches 192, and the communication notch 193, the flow rate of the hydraulic oil flowing into the first passage 123a of the outflow passage 123 is controlled by the first notches 191, the second notches 192, and the communication notch 193, and the flow rate of the hydraulic oil flowing into the first passage 123a can be controlled.

According to the embodiment described above, the following effects are obtained.

The valve device 100 includes the third supply passage 197 that allows the second supply port 121b to communicate with the outflow passage 123 in the process of the main spool 170 moving towards the forward position (one stroke end), and allows the first supply port 121a to communicate with the outflow passage 123 in the process of the main spool 170 moving towards the retracted position (the other stroke end). As a result, when the main spool 170 moves to both stroke ends, the working fluid is guided to the outflow passage 123 from both of the first and second supply ports 121a and 121b rather than from either one thereof. As a result, the flow rate of the hydraulic oil guided to the travel motor 111 through the outflow passage 123 from the first and second supply ports 121a and 121b is increased.

In the valve device 100, the hydraulic oil is guided from the opening of the first supply port 121a to the opening of the outflow passage 123 through the interior of the main accommodation hole 150, and the hydraulic oil is guided from the opening of the second supply port 121b to the opening of the outflow passage 123 through the interior of the main accommodation hole 150, in both the process of the main spool 170 moving toward the forward position and the process of the main spool 170 moving toward the retracted position. In other words, the flow of the hydraulic oil from the first supply port 121a to the outflow passage 123 and the flow of the hydraulic oil from the second supply port 121b to the outflow passage 123 inside the main accommodation hole 150 are in opposite directions in the axial direction of the main spool 170. As a result, a fluid force from the hydraulic oil guided from the first supply port 121a to the outflow passage 123 acting on the main spool 170 and a fluid force from the hydraulic oil guided from the second supply port 121b to the outflow passage 123 acting on the main spool 170 can be canceled out, and the hysteresis of the main spool 170 is improved and the operation of the valve device 100 is improved.

The following modification is also within the scope of the present invention, and it is also possible to combine the configurations shown in the modification with the configurations described in the above-described embodiment, combine the configurations described in the above-described different embodiments, or combine the configurations described in the following different modifications.

<Modification>

Figure 4:
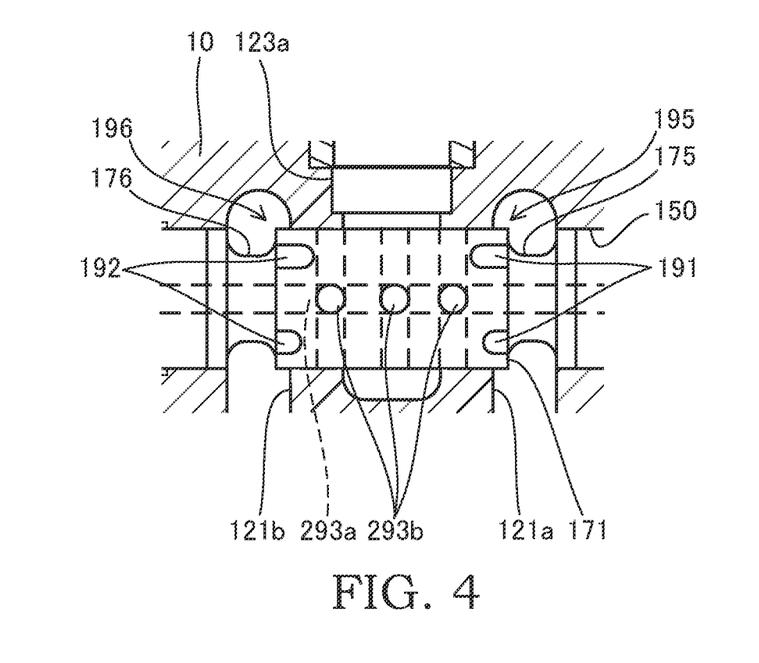
FIG. 4 is an enlarged cross-sectional view showing an enlarged supply-side land portion of a main spool of a valve device according to a modification of the embodiment of the present invention, showing a state in which the main spool is in a neutral position.

In the embodiment described above, the third supply passage 197 includes the communication notch 193 formed on the outer peripheral surface of the supply-side land portion 171. Alternatively, as shown in FIG. 4, the third supply passage 197 may include a first through hole 293a axially penetrating the main spool 170, and a plurality of second through holes 293b communicating with the first through hole 293a and radially penetrating the supply-side land portion 171. The plurality of second through holes 293b are provided side by side in the axial direction of the main spool 170. The plurality of second through holes 293b communicate with each other through the first through hole 293a. When the main spool 170 moves to the forward position (the left side in FIG. 4), the second supply port 121b and the outflow passage 123 communicate with each other through the leftmost second through hole 293b and the rightmost second through hole 293b in FIG. 4. When the main spool 170 moves to the retracted position (the right side in FIG. 4), the first supply port 121a and the outflow passage 123 communicate with each other through the rightmost second through hole 293b and the leftmost second through hole 293b in FIG. 4.

Figure 5:
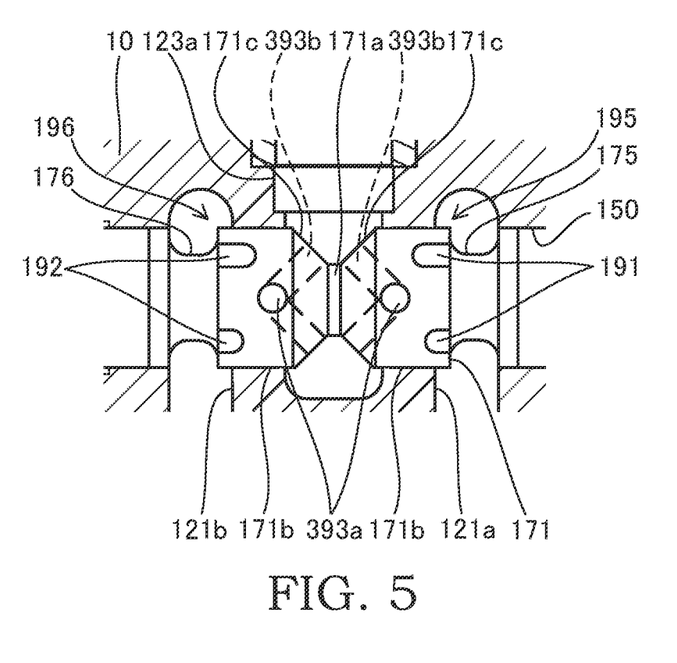
FIG. 5 is an enlarged cross-sectional view showing the enlarged supply-side land portion of the main spool of the valve device according to the modification of the embodiment of the present invention, which is shown in correspondence with FIG. 4.

As shown in FIG. 5, the supply-side land portion 171 of the main spool 170 is provided with a small diameter portion 171a; a pair of large diameter portions 171b provided at positions sandwiching the small diameter portion 171a, and a pair of tapered portions 171c provided between the small diameter portion 171a and the pair of large diameter portions 171b. In this case, instead of the communication notch 193, the third supply passage 197 may include a pair of first through holes 393a radially penetrating the pair of large diameter portions 171b, and a plurality of second through holes 393b communicating with each of the pair of first through holes 393a and opening to the tapered portions 171c. Each of the plurality of second through holes 393b communicates with one of the pair of first through holes 393a and opens to the tapered portions 171c. When the main spool 170 moves to the forward position, the second supply port 121b and the outflow passage 123 communicate with each other through the first through hole 393a on the left side in FIG. 5 and the second through hole 393b communicating with the first through hole 393a. When the main spool 170 moves to the retracted position, the first supply port 121a and the outflow passage 123 communicate with each other through the first through hole 393a on the right side in FIG. 5 and the second through hole 393b communicating with the first through hole 393a. Even with these configurations, the same effects as those of the above-described embodiment can be obtained.

The configurations, functions, and effects of the embodiment of the present invention configured as described above will be collectively described.

The valve device 100, which controls the flow of working fluid supplied from the hydraulic pump 110 to the travel motor 111 as an actuator, includes: the main spool 170 as a spool that is movable in the axial direction, and the valve block 10 as a valve body that slidably accommodates the main spool 170; and the valve block 10 includes: the first and second supply ports 121a and 121b to which the working fluid discharged from the hydraulic pump 110 is supplied, the first and second actuator passages 125a and 125b communicating with the travel motor 111, the discharge passage 129 communicating with the tank 119, and the outflow passage 123 that guides the working fluid from the first and second supply ports 121a and 121b to the first and second actuator passages 125a and 125b; and the main spool 170 includes: the first supply passage 195, which guides the working fluid from the first supply port 121a to the outflow passage 123 as the main spool 170 moves and provides resistance to the flow of the working fluid passing through, the second supply passage 196, which guides the working fluid from the second supply port 121b to the outflow passage 123 as the main spool 170 moves and provides resistance to the flow of the working fluid passing through, the third supply passage 197, which allows the first supply port 121a to communicate with the outflow passage 123, and allows the second supply port 121b to communicate with the outflow passage 123, and provides resistance to the working fluid passing through, and the supply-side land portion 171, which can block the communication between the first, second, and third supply passages 195, 196, 197 and the outflow passage 123 and is provided as a land portion; and when the main spool 170 is in the neutral position, the supply-side land portion 171 blocks the communication between the first supply port 121a and the outflow passage 123 and the communication between the second supply port 121b and the outflow passage 123; and the first supply passage 195 allows the first supply port 121a to communicate with the outflow passage 123 in the process of the main spool 170 moving from the neutral position toward the one stroke end in the axial direction; and the second supply passage 196 allows the second supply port 121b to communicate with the outflow passage 123 in the process of the main spool 170 moving from the neutral position toward the other stroke end in the axial direction; and the third supply passage 197 allows the second supply port 121b to communicate with the outflow passage 123 in the process of the main spool 170 moving towards the one stroke end, and allows the first supply port 121a to communicate with the outflow passage 123 in the process of the main spool 170 moving towards the other stroke end.

With this configuration, the third supply passage 197 allows the second supply port 121b to communicate with the outflow passage 123 while the main spool 170 is in the one stroke end, and allows the first supply port 121a to communicate with the outflow passage 123 while the main spool 170 is in the other stroke end. As a result, when the main spool 170 moves to both stroke ends, the working fluid is guided to the outflow passage 123 from both of the first and second supply ports 121a and 121b rather than from either one thereof. Therefore, the flow rate of the working fluid guided to the actuator from the supply ports 121a and 121b is increased.

In the valve device 100, the valve block 10 is provided with the main accommodation hole 150 as an accommodation hole that slidably accommodates the main spool 170, and the first supply port 121a, the second supply port 121b, and the outflow passage 123 are opened to the main accommodation hole 150, and the opening of the outflow passage 123 is provided between the opening of the first supply port 121a and the opening of the second supply port 121b in the axial direction, and the hydraulic oil is guided from the opening of the first supply port 121a to the opening of the outflow passage 123 through the interior of the main accommodation hole 150, and the hydraulic oil is guided from the opening of the second supply port 121b to the opening of the outflow passage 123 through the interior of the main accommodation hole 150, in both the process of the main spool 170 moving toward the one stroke end and the process of the main spool 170 moving toward the other stroke end.

With this configuration, the fluid force generated when the working fluid is guided from the first supply port 121a to the outflow passage 123 and the fluid force generated when the working fluid is guided from the second supply port 121b to the outflow passage 123 can be canceled out by each other.

In the valve device 100, the third supply passage 197 includes the communication notch 193 that opens to the outer peripheral surface of the supply-side land portion 171, and allows the communication between the first supply port 121*a* and the outflow passage 123 and the communication between the second supply port 121*b* and the outflow passage 123.

With this configuration, the communication notch 193 of the third supply passage 197, the first supply passage 195, and the second supply passage 196 can allow the communication between both the first and second supply ports 121*a* and 121*b* and the outflow passage 123.

Embodiments of the present invention were described above, but the above embodiments are merely examples of applications of the present invention, and the technical scope of the present invention is not limited to the specific constitutions of the above embodiments.

With respect to the above description, the contents of application No. 2021-200730, with a filing date of Dec. 10, 2021 in Japan, are incorporated herein by reference.

The invention claimed is:

1. A valve device for controlling a flow of a working fluid supplied from a hydraulic pump to an actuator, the valve device comprising:
   a spool that is movable in an axial direction; and
   a valve body that slidably accommodates the spool, wherein
   the valve body includes:
      a first supply port and a second supply port that is supplied with the working fluid discharged from the hydraulic pump,
      a first actuator passage and a second actuator passage in communication with the actuator,
      a discharge passage in communication with a tank, and
      an outflow passage that guides the working fluid from the first supply port and the second supply port to the first actuator passage and the second actuator passage,
   the spool includes:
      a first supply passage that guides the working fluid from the first supply port to the outflow passage as the spool moves and provides resistance to a flow of the working fluid that passes through the first supply passage,
      a second supply passage that guides the working fluid from the second supply port to the outflow passage as the spool moves and provides resistance to a flow of the working fluid that passes through the second supply passage,
      a third supply passage that allows the first supply port to communicate with the outflow passage and the second supply port to communicate with the outflow passage, and provides resistance to the working fluid that passes through the third supply passage, and
      a land portion that is capable of blocking communications of the first supply passage, the second supply passage, and the third supply passage with the outflow passage, the land portion blocks communication between the first supply port and the outflow passage and communication between the second supply port and the outflow passage when the spool is in a neutral position, the first supply passage allows the first supply port to communicate with the outflow passage in a process of the spool moving from the neutral position toward one stroke end in the axial direction, the second supply passage allows the second supply port to communicate with the outflow passage in a process of the spool moving from the neutral position toward the other stroke end in the axial direction, and the third supply passage allows the second supply port to communicate with the outflow passage in the process of the spool moving toward the one stroke end, and allows the first supply port to communicate with the outflow passage in the process of the spool moving toward the other stroke end.

2. The valve device according to claim 1, wherein the valve body is provided with an accommodation hole that slidably accommodates the spool, the first supply port, the second supply port, and the outflow passage are opened to the accommodation hole, and an opening of the outflow passage is provided between an opening of the first supply port and an opening of the second supply port in the axial direction, and the working fluid is guided from the opening of the first supply port to the opening of the outflow passage through an interior of the accommodation hole, and the working fluid is guided from the opening of the second supply port to the opening of the outflow passage through the interior of the accommodation hole, in both the process of the spool moving toward the one stroke end and the process of the spool moving toward the other stroke end.

3. The valve device according to claim 1, wherein the third supply passage includes a communication notch that opens to an outer peripheral surface of the land portion, and allows the first supply port to communicate with the outflow passage and that allows the second supply port to communicate with the outflow passage.

4. The valve device according to claim 2, wherein the third supply passage includes a communication notch that opens to an outer peripheral surface of the land portion, and allows the first supply port to communicate with the outflow passage and that allows the second supply port to communicate with the outflow passage.

\* \* \* \* \*